(12) United States Patent
Couwenberg et al.

(10) Patent No.: US 7,164,241 B2
(45) Date of Patent: Jan. 16, 2007

(54) METHOD AND APPARATUS FOR DRIVING A GAS DISCHARGE LAMP

(75) Inventors: Winston Donald Couwenberg, Eindhoven (NL); Wilhelmus Hinderikus Maria Langeslag, Nijmegen (NL); Ludovicus Franciscus Johanes Oostvogels, Eindhoven (NL); Johannis Antonie Amerens Toonen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/491,865

(22) PCT Filed: Oct. 11, 2002

(86) PCT No.: PCT/IB02/04205

§ 371 (c)(1),
(2), (4) Date: Apr. 7, 2004

(87) PCT Pub. No.: WO03/034795

PCT Pub. Date: Apr. 24, 2003

(65) Prior Publication Data

US 2004/0245945 A1    Dec. 9, 2004

(30) Foreign Application Priority Data

Oct. 12, 2001    (EP)    ................... 01203910

(51) Int. Cl.
G05F 1/00    (2006.01)
H05B 37/02    (2006.01)
H05B 39/04    (2006.01)
H05B 41/36    (2006.01)

(52) U.S. Cl. ............... 315/291; 315/209 R; 363/95

(58) Field of Classification Search ............... 315/291, 315/209 R, 84.51, 65, 326, 361, DIG. 7; 363/95, 97, 89, 34, 77–81
See application file for complete search history.

(56) References Cited

U.S. PATENT DOCUMENTS

| | | | | |
|---|---|---|---|---|
| 5,491,388 | A * | 2/1996 | Nobuyuki et al. | 315/308 |
| 6,144,171 | A * | 11/2000 | Clements et al. | 315/289 |
| 6,373,199 | B1 * | 4/2002 | Erhardt et al. | 315/289 |
| 6,388,397 | B1 * | 5/2002 | Iwahori | 315/307 |
| 6,476,568 | B1 * | 11/2002 | Urakabe et al. | 315/307 |
| 2002/0057062 | A1 | 5/2002 | Hiroyasu et al. | |

FOREIGN PATENT DOCUMENTS

WO    WO 01 67828    9/2001

* cited by examiner

*Primary Examiner*—Don Wong
*Assistant Examiner*—Marie Antoinette Cabucos

(57) ABSTRACT

A method for driving a gas discharge lamp (1) is described, wherein electric first DC power is provided at a relatively high voltage and a relatively low current. Said first power is converted down to second DC power at a relatively low voltage and a relatively high current. Said second power is fed to a gas discharge lamp, preferably via a commutator. The conversion of said first power to said second power is performed in at least two steps, a first one of such steps including the step of converting down said first power to an intermediate DC power at an intermediate DC voltage lower (VM) than said first DC voltage but higher than said second DC voltage. A downconverter device (30) for use in a driving apparatus (10) for a gas discharge lamp (1) is described. The downconverter device comprises at least two downconverter units (31, 32) connected in series, for converting down said intermediate DC power to said second power.

17 Claims, 3 Drawing Sheets

METHOD AND APPARATUS FOR DRIVING A GAS DISCHARGE LAMP

Figure 1:
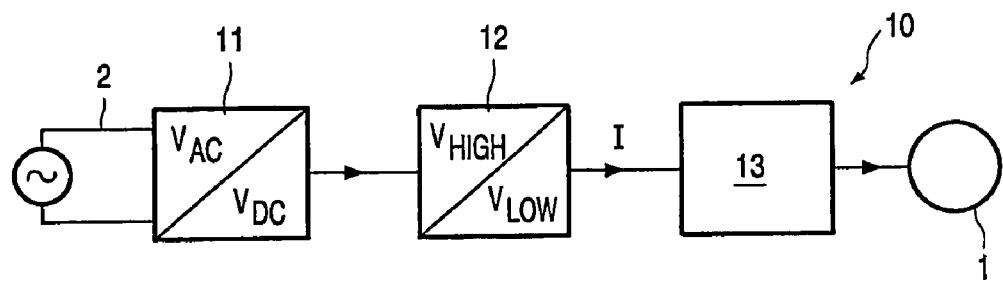

The present invention relates in general to a method and apparatus for driving a gas discharge lamp. More particularly, the present invention relates to a method and a device for driving a UHP lamp, and the present invention will be explained in more detail hereafter with reference to such type of lamp; however, the present invention is not restricted to such application.

A UHP (ultra high pressure) lamp comprises, generally speaking, two electrodes in a gas-filled bulb; after ignition, an arc burns between said two electrodes and generates light.

An electronic ballast for driving such a lamp generally comprises, in series, a downconverter device and a commutator device. The downconverter device receives an input DC voltage, and generates an output DC current. The downconverter device may receive its input DC voltage from a specific DC voltage source, but generally the electronic ballast is intended for powering from AC mains and comprises a converter, usually an upconverter, coupled to the input of the downconverter device for rectifying the AC mains voltage to DC voltage. The commutator transforms the DC current generated by the downconverter device into AC current, which is applied to a lamp, possibly via a transformer.

Electronic ballasts of the type described above are commonly known. In the state of the art, the downconverter device consists of only one downconverter unit, directly converting an input voltage to an output current. This design involves some disadvantages. These disadvantages may be accepted in present-day situations, but become more and more disadvantageous if the lamp voltage is decreased and/or the lamp current is increased.

UHP lamps are particularly useful because of their high brightness, and for this reason these lamps are applied inter alia in projectors. For use in a projector, it is desirable that the light-generating spot of any lamp is as small as possible. Furthermore, there is a need for lamps with increased power. These needs can be met by placing the lamp electrodes closer together, and by increasing the lamp current. Placing the lamp electrodes closer together will result in a shorter arc and hence a shorter light-generating spot, and will also result in a lower lamp voltage.

A first problem in a downconverter is that the power losses within the downconverter depend on the ratio of input voltage to output voltage: the higher this ratio, the higher the switching losses.

A second problem is that the induction value of a coil within the downconverter depends on the ratio of input voltage to output voltage: the higher this ratio, the larger this inductance must be.

A further problem is that due to a decreasing output voltage and an increasing output current, while the input voltage remains the same, the switches within the downconverter must switch larger currents in smaller duty cycles, which also leads to inefficient switching behavior.

It is a general objective of the present invention to overcome these problems. More particularly, the present invention aims to provide a more efficient design for a downconverter device.

In order to attain these objectives, the present invention proposes a two-stage downconverter device, comprising a first downconverter unit and a second downconverter unit coupled in series, wherein the first downconverter unit receives the input DC voltage and transforms it to an intermediate voltage, whereas the second downconverter unit receives the intermediate output voltage from the first downconverter unit and generates the desired output DC current. In each of the downconverter units, the ratio of input voltage to output voltage now is much lower and, although the precise value of the intermediate voltage is not essential, it is a design parameter which can be adapted in order to optimize the voltage ratios in said two downconverter units and the power losses depending thereon. Furthermore, each downconverter unit operates more efficiently, and in each downconverter the coil can be smaller and operate at a higher frequency, such that the amount of magnetic material can be reduced.

Figure 2:
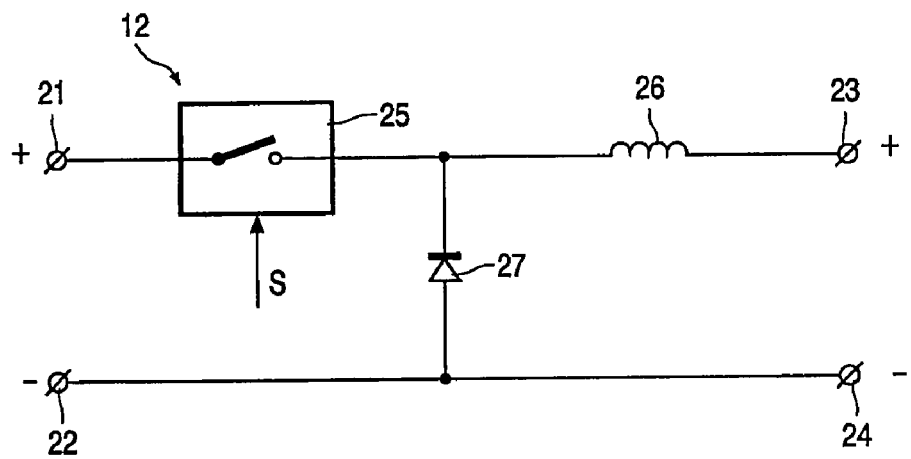
Figure 3:
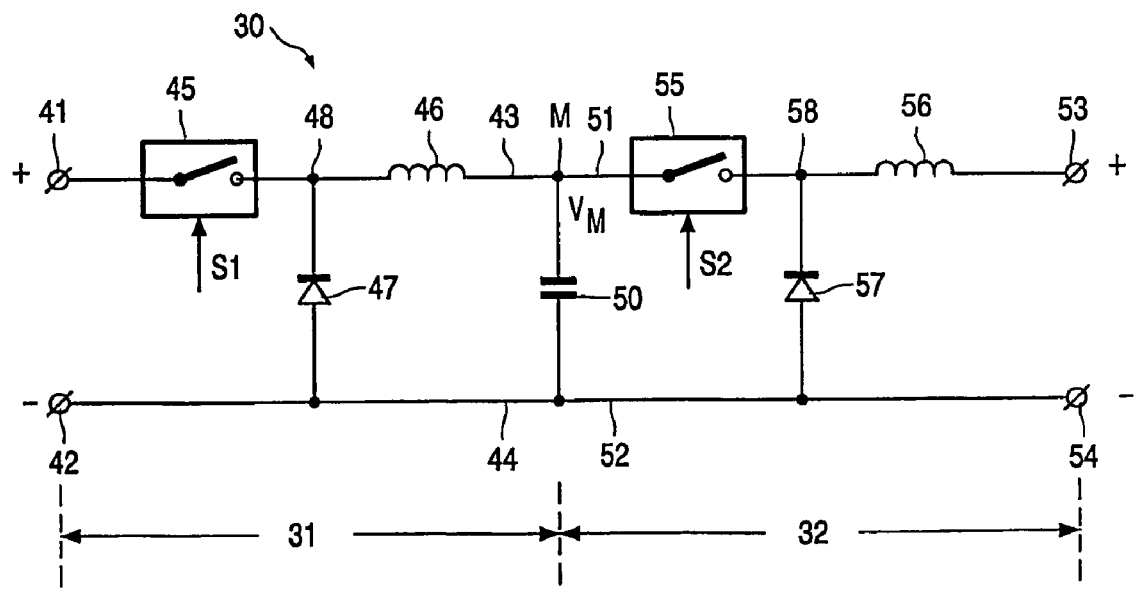
Figure 4A:
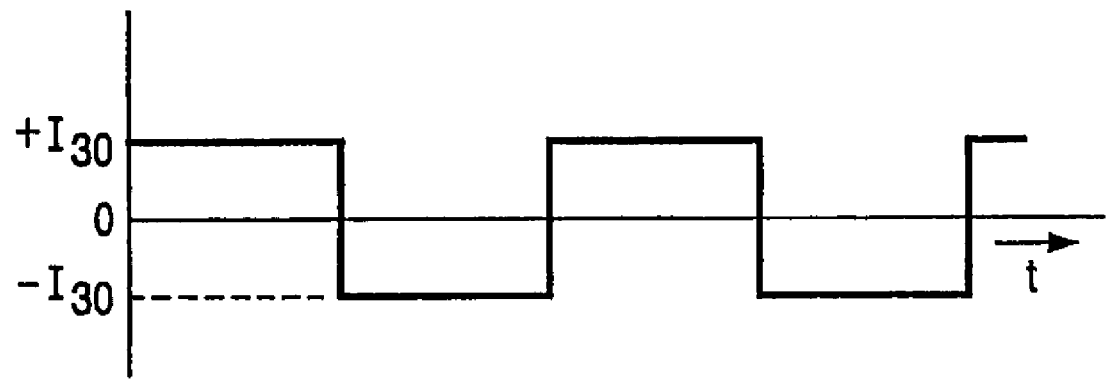
Figure 4B:
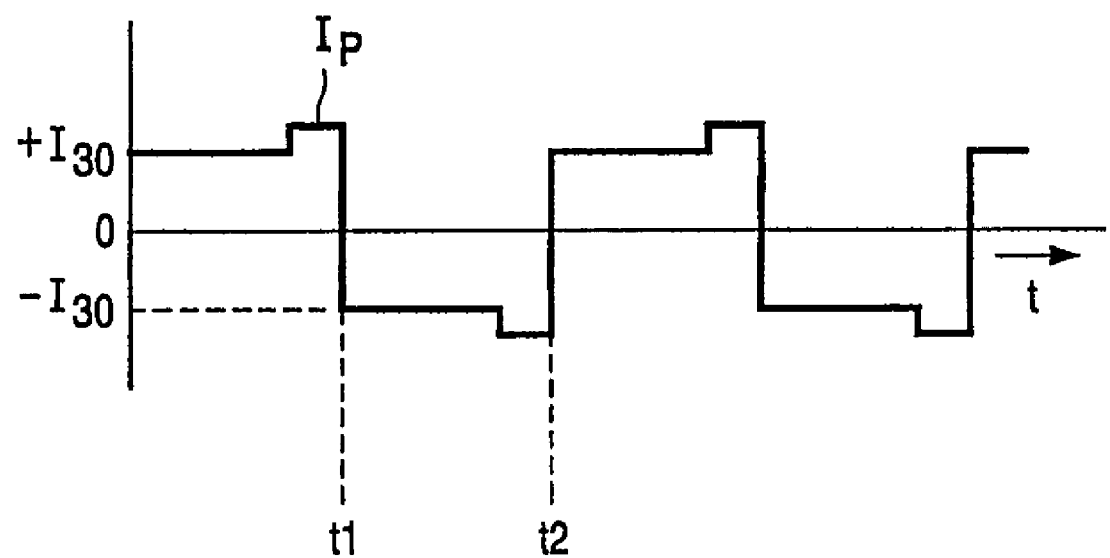
Figure 5:
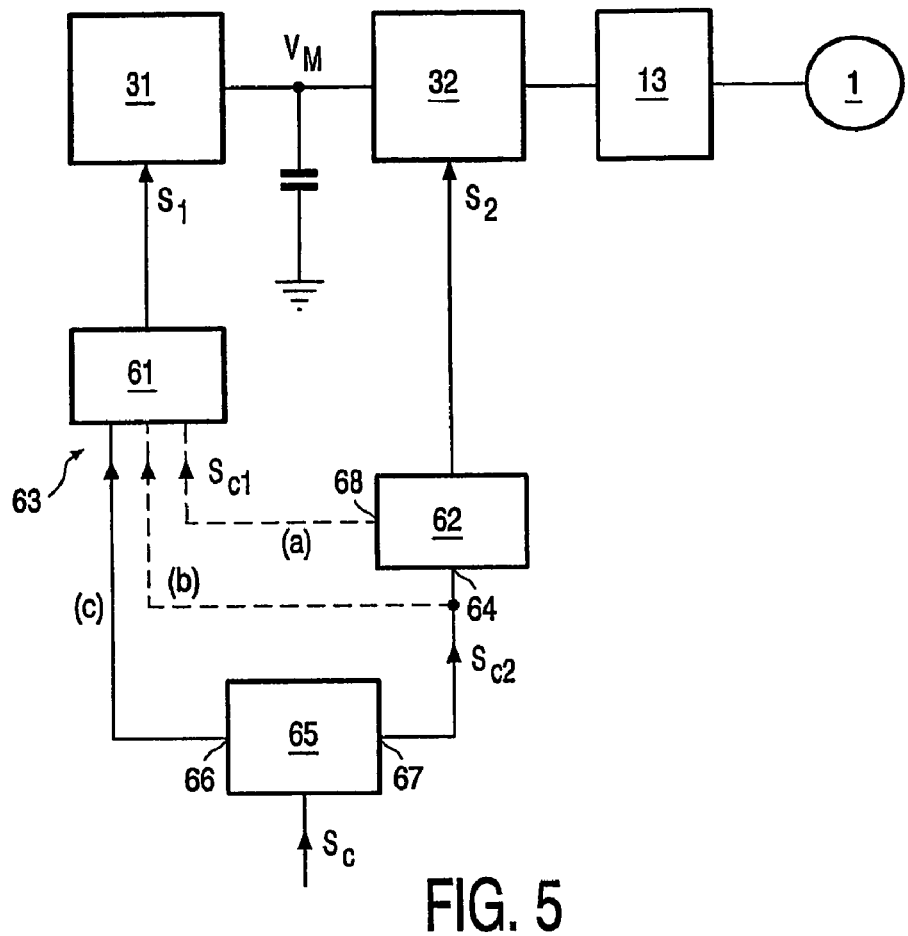
Figure 6:
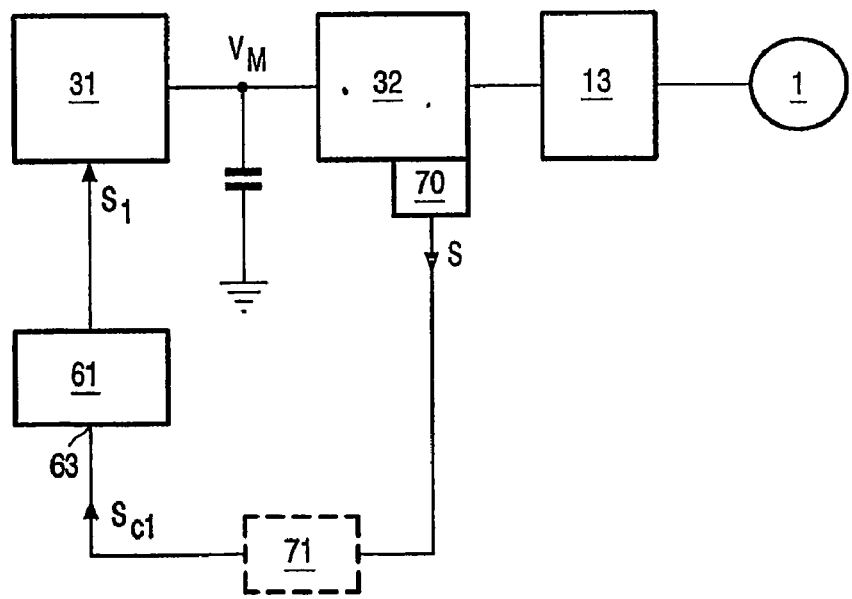

The above-discussed and other aspects, features and advantages of the present invention will be explained in more detail in the following discussion of a preferred embodiment with reference to the drawing, in which:

FIG. 1 schematically shows a functional block diagram of a driving apparatus for a gas discharge lamp;

FIG. 2 schematically illustrates a prior art downconverter device;

FIG. 3 schematically illustrates a downconverter device in accordance with the present invention;

FIG. 4A schematically illustrates the wave form of the current through a lamp;

FIG. 4B also schematically illustrates the wave form of the current through a lamp, the current now including anti-flutter pulses;

FIG. 5 is a schematic block diagram illustrating the control of downconverter units; and FIG. 6 illustrates an alternative embodiment.

FIG. 1 schematically shows a functional block diagram of a driving apparatus 10 for a gas discharge lamp 1. The apparatus 10 is arranged for connection to AC mains 2, and comprises an AC/DC converter 11, which receives at its input an AC mains voltage, typically in the order of about 220 V, and provides at its output a DC output voltage, typically in the order of about 400 V.

The driver device 10 further comprises a downconverter device 12, which receives the DC output voltage of the AC/DC converter 11, and which serves as a current source providing at its output a DC output current $I_{OUT}$, suitable for feeding the lamp 1. If the lamp 1 is a UHP lamp, the output current $I_{OUT}$ of the downconverter device 12 will typically be in the order of about 6 ampere. The lamp characteristics of the lamp 1 determine the voltage drop across the lamp 1 and therefore the output voltage of the downconverter device 12; typically, this output voltage is in the order of about 75 V.

The driver apparatus 10 further comprises a commutator 13 which is arranged for transforming the DC current $I_{OUT}$ to an AC current.

The design and operation of the AC/DC converter 11 and the commutator 13 form no part of the present invention, and the state of the art converters and commutators can be used in their place. Therefore, the design and operation of the AC/DC converter 11 and the commutator 13 will not be discussed in further detail here.

FIG. 2 schematically illustrates the basics of the design of a state of the art downconverter device. Typically, such a downconverter device comprises two input terminals 21, 22 for receiving a DC input voltage, and two output terminals 23, 24 for providing the output current. In the example shown, the positive input terminal 21 is connected to a controllable switch 25, which in turn is connected to a first terminal of a coil 26, the other terminal of which is connected to the positive output terminal 23. The negative input terminal 22 is connected to the negative output terminal 24 and to the anode of a diode 27, the cathode of which is connected to the node between controllable switch 25 and coil 26. The controllable switch 25 receives a control signal S, which causes the switch 25 to open and close at a predetermined rate, typically in the order of 200 kHz. As a result of this switched voltage, the coil 26 will generate a current, the shape of which resembles a triangle.

As mentioned above, the downconverter device serves as a current source, the output voltage at the output terminals 23, 24 being determined by the impedance of a load connected to the output 23, 24. In the case of a UHP lamp, of a type as is commonly used in practice, the output voltage at the output terminals 23, 24 will typically be in the order of about 75 V. However, if such lamps would be adapted such that their electrode distance becomes shorter, the output voltage at the output terminals 23, 24 of the downconverter device 12 would decrease, whereas the input voltage at the input terminals 21, 22 would remain the same, thus increasing the input/output ratio. If it were desired to maintain the lamp power, the lamp current would have to increase; if it were desired to increase the power of such lamps, the current would have to increase more than proportionally. This would give rise to the problems discussed above.

FIG. 3 schematically illustrates an inventive downconverter device 30, designed to overcome such problems. Basically, the downconverter device 30 according to the present invention comprises two downconverter stages 31, 32 arranged in series, each of the downconverter stages 31, 32 being of conventional design. Thus, it can be recognized in FIG. 3 that the first downconverter stage 31 has input terminals 41, 42 for receiving a DC input voltage, such as the output voltage of the AC/DC converter 11 discussed above. Furthermore, the first downconverter stage 31 comprises a first controllable switch 45, controlled by a first control signal S1 and connected to a first node 48 between a first coil 46 and the cathode of a first diode 47 whose anode is connected to the negative input terminal 42. The opposite end of the first coil 46, opposite the first node 48, can be considered as constituting a positive output terminal 43 of the first downconverter stage 31, whereas the negative input terminal 42 can be considered as constituting a reference line determining also the negative output terminal 44.

Likewise, the second downconverter stage 32 has a positive input terminal 51 connected to the positive output terminal 43 of the first downconverter stage 31, and a negative input terminal 52 connected to the negative output terminal 44 of the first downconverter stage 31. The second downconverter stage 32 has a positive output terminal 53 and a negative output terminal 54, providing a lamp current. A second controllable switch 55, controlled by a second control signal S2, is connected to the positive input terminal 51 and is further connected to a second node 58 between the cathode of a second diode 57 and a second coil 56, the other end of which is connected to the positive output terminal 53, whereas the anode of the second diode 57 is connected to the reference line between negative input terminal 52 and negative output terminal 54.

It will be clear to a person skilled in the art that the voltage $V_m$ at the connection of first positive output terminal 43 and second positive input terminal 51, hereinafter referred to as node M, will be lower than the voltage at the first positive input terminal 41 of the first downconverter stage 31 and higher than the voltage at the second positive output terminal 53 of the second downconverter stage 32. The precise value of this intermediate voltage $V_m$ depends inter alia on the duty cycle of the first control signal S1 in relation to the duty cycle of the second control signal S2, and on the inductance of the first coil 46 and the second coil 56, as will be clear to a person skilled in the art. Preferably, the components are designed such that the intermediate voltage $V_m$ is in the order of about 175 V. Then, the voltage ratio of input voltage to output voltage of the first downconverter stage 31 is approximately equal to the voltage ratio of the input voltage to the output voltage of the second downconverter stage 32, i.e. about 2.3.

By designing the downconverter device 30 as a two-stage downconverter, the demands on each of the downconverter stages 31, 32 are less than the demands on a one-stage downconverter device, such as the state-of-the-art downconverter device 12, which has to meet the same requirements at its input and its output. Specifically, the first downconverter 31 can now, independently of the second downconverter 32, be optimized to take care of the high voltages to be expected at the input 41, while the second downconverter 32, independently of the first downconverter 31, can be optimized to take care of the high lamp currents. This means that, instead of having one coil 26 which needs to be designed to take care of high input voltage as well as high output current, it is now possible to have a first coil 46 which is designed to take care of relatively high voltages at relatively low currents, and to have a second coil 56 designed to take care of relatively high currents at relatively low voltages. The two coils 46, 56 can each be made smaller, to such extent that the combined amount of magnetic material can be less than the amount necessary for implementing a single coil 26. Furthermore, the losses in the two-stage downconverter device 30 proposed by the present invention are much smaller than in the conventional one-stage downconverter device 12.

This can be demonstrated by the following example, showing test results of a computer simulation, for the situation where the lamp 1 is a UHP lamp, the driver delivers 4 ampere, and the lamp voltage is 75 V. The input voltage at the downconverter device is assumed to be 400 VDC. It was calculated that the losses in a coil 26 would amount to about 3 W, that the switching losses in the controllable switch would amount to about 3.5 W, that the conduction losses in the controllable switch 25 would amount to about 1.6 W, and that the losses in the diodes 27 would amount to about 4 W: a total loss of about 12 W.

In contrast, in the design proposed by the present invention, smaller coils could be used, each leading to a loss of about 1.75 W. The switching losses in the first controllable switch 45 were calculated to amount to about 0.2 W, while the switching losses for the second controllable switch 55 were calculated to amount to about 0.3 W. The conduction losses for said switches were calculated to amount to about 1.2 W and 1.1 W, respectively. The losses in the first diode 47 and second diode 57 were calculated to amount to about 1 W and 2.5 W, respectively. Thus, the total loss in the two-stage downconverter device 30 proposed by the present invention amounts to about 9.8 W: a reduction by about 20%.

For the proper operation of the two-stage downconverter device 30 as a whole, it is desirable that the second downconverter unit 32 is fed by a constant voltage at its input terminals 51, 52. This can be assured by arranging a capacitor 50 over the input terminals 51, 52 of the second downconverter unit 32, as is also shown in FIG. 3. This capacitor 50 may be considered part of the first downconverter 31, such that the first downconverter 31 thus extended behaves like a voltage source. It is also possible to consider said capacitor 50 as part of the input stage of the second downconverter unit 32. Alternatively, it is possible to consider the capacitor 50 as a separate coupling stage between the output 43, 44 of the first downconverter unit 31 and the input terminals 51, 52 of the second downconverter unit 32.

It is noted that, in practice, a small capacitor is also connected over the output terminals 53, 54 of the second downconverter stage 32. This capacitor, which is not shown in FIG. 3 for the sake of clarity, serves to filter the output current rather than to stabilize the output voltage.

The voltage at the positive input terminal 51 of the second downconverter stage 32 should be as constant as possible, irrespective of any load variations at the output 53, 54 of the second downconverter unit 32. This can be ensured by choosing a high capacitive value for said capacitor 50. The larger the load variations to be expected, the larger the capacitor 50 should be chosen. However, the need to arrange a large capacitor is disadvantageous. Therefore, in a further elaboration of the present invention, control of the first downconverter unit 31 is adapted to anticipate or respond to load variation at the output of the second downconverter unit 32.

In general, two types of load variations can be distinguished. A first type of load variations is a deliberate load variation; a second type of load variations is a non-deliberate or unexpected or circumstantial load variation.

An example of a deliberate load variation is the so-called anti-flutter current pulse, as will now be explained.

FIG. 4A illustrates schematically the wave form of the current through the lamp 1. The downconverter device 30 generates a current which can be considered as being constant; the magnitude of this current will be indicated as 130. The commutator 13 converts this DC current into an AC current; this AC current output from the commutator 13 is, however, not sine-shaped: the output current from the commutator 13 can be described as a constant current with changing directions. In other words, the output current from the commutator 13 is either $+I_{30}$ or $-I_{30}$, as shown in FIG. 4A.

HP lamps appear to have a somewhat undesirable behavior during commutation, i.e. during those short moments that the current changes direction; this undesirable behavior can be improved by slightly increasing the current directly before commutation, as illustrated in FIG. 4B.

FIG. 4B shows the same current form-as shown in FIG. 4A, i.e. a constant current having a magnitude $I_{30}$ determined by the downconverter device 30, but changing direction at times t1, t2, etcetera. FIG. 4B also shows that, directly before such commutation moment t1, a brief current pulse $I_p$ is added to the current, such that during a brief moment immediately before commutation the actual current has a magnitude of $(I_{30}+I_p)$. The same current pulse is added directly before commutation from $-I_{30}$ to $+I_{30}$, as shown in FIG. 4B. The shape of these current pulses $I_p$ is not critical, or at least is not important for the present invention. In the context of the present invention it is important to realize that such extra current pulses $I_p$ constitute an additional load for the downconverter device 30, which needs to deliver the additional current. It will easily be recognized by a person skilled in the art that, if no measures are taken, such additional current pulse $I_p$ may cause a decrease at the positive input terminal 51 of the second downconverter unit 32. The amount of such decrease can be limited by increasing the capacitive value of the capacitor 50, but this is undesirable.

In a preferred embodiment proposed by the present invention, voltage variations at the input of the second downconverter unit 32 due to load current variations are counteracted by corresponding current variations in the first downconverter unit 31.

As mentioned earlier, the output current of a downconverter unit is controlled by a control signal S, controlling a switch (45; 55) in an input stage of a downconverter unit. Briefly stated, the current as generated by a downconverter unit depends on the duty cycle of such switch. FIG. 5 is a schematic block diagram illustrating the control of the downconverter units. The downconverter units 31 and 32 are represented by a simple block, receiving control signal S1 and S2, respectively, for their controllable switch 45 and 55, respectively, from a first control unit 61 and a second control unit 62, respectively. Since control units for generating a control signal for operating the controllable switch in a downconverter are known per se, such control units need not be explained here in more detail.

The first control unit 61 for the first downconverter unit 31 has an input 63 for receiving a command signal $S_{C1}$, which is a signal representing the current magnitude expected at the output 43 of the first downconverter unit 31. The first control unit 61 is adapted to generate the control signal S1 for the first downconverter 31 in such a way, that the output current generated by the first downconverter 31 reflects the instant value of the command signal $S_{C1}$. For instance, the first control unit 61 will adapt the duty cycle of the control signal S1 accordingly, as will be clear to a person skilled in the art.

Similarly, the second control unit 62 generating the second control signal S2 for the second switch 55 in the second downconverter unit 32 has an input 64 for receiving a second command signal $S_{C2}$, representing the instant output current magnitude desired. The shape of the second command signal $S_{C2}$ may reflect the additional current pulse $I_p$ mentioned above. Alternatively, the second control unit 62 may be itself programmed to generate the second control signal S2 in such a way, that the additional current pulse $I_p$ results.

In one implementation of the present invention, the command signal $S_{C1}$ for the first control unit 61 has a constant value, or the first control unit 61 does not receive any command signal $S_{C1}$ at all but instead is programmed to generate a constant control signal S1. However, in an improved preferred implementation, the first control unit 61 is controlled, directly or indirectly, by the second command signal $S_{C2}$ for the second control unit 62. Three possible embodiments of this improved preferred implementation are illustrated in FIG. 5.

In a first variation, the second control unit 62 has an output 65 coupled to the command input 63 of the first control unit 61. Thus, the second control unit 62 may generate an adequate command signal for the first control unit 61, which may be identical to the command signal $S_{C2}$ received at its command input 64, or modified in a suitable way.

In a second variation, in case the first command signal $S_{C1}$ for the first control unit 61 can be identical to the second command signal $S_{C2}$ for the second control unit 62, the second command signal $S_{C2}$ may be supplied to both control units 61, 62, as indicated in FIG. 5 at (b).

It is even more preferred that the operation of the first downconverter 31 anticipates such load variations of the second downconverter 32. A third variation allowing this feature is illustrated in FIG. 5 at (c). In this variation, a master command signal $S_C$ is received by a master control unit 65, having a first output 66 and a second output 67. The master control unit 65 is arranged for generating an adequate command signal $S_{C1}$ at its first output 66 and for generating an adequate second command signal $S_{C2}$ at its second output 67. In order to have the first downconverter unit 31 anticipate any load variations controlled by the master command signal $S_C$, the master control unit 65 may be designed for generating the second command signal $S_{C2}$ with a slight delay with respect to the first command signal $S_{C1}$.

The embodiments described above with reference to FIG. 5 can take into account the intentional load variations such as the additional current pulse $I_p$. FIG. 6 illustrates an embodiment which can take into account unintentional and unexpected load variations, such as variations caused by the lamp 1. For instance, a sudden decrease of the load may lead to an undesirable increase of the voltage $V_M$.

In FIG. 6, the first downconverter unit 31 is associated with a first control unit 61 having a command input 63 and generating the first control signal S1 on the basis of a command signal $S_{C1}$ received at its command input 63. The second downconverter unit 32 is provided with an output sensor 70 providing an output signal S reflecting the output conditions of the second downconverter unit 32. Depending on design specifications, such sensor 70 may be a current sensor such that its output signal S reflects the instant current as currently generated by the second downconverter unit 32. Alternatively, the sensor 70 may be a voltage sensor such that its output signal S reflects the instant lamp voltage. In a combined embodiment, both current and voltage are sensed such that the output signal S reflects the instant lamp power.

The sensor 70 and the first control unit 61 for the first downconverter unit 31 may be adapted to each other, such that the sensor output signal S is suitable for direct connection to the command input 63 of the first control unit 61. Alternatively, if some modification of the sensor output signal S is necessary in order to provide the first command signal $S_{C1}$, a modifier 71 may be arranged.

It should be clear to persons skilled in the art that the present invention is not limited to the examples discussed in the above. Instead, several amendments and modifications are possible without departing from the scope of the invention as defined in the appending claims.

For instance, although in the above two downconverter units 31, 32 in series are described, it is also possible to have three or more downconverter units in series. In such a case, it is preferred to have a capacitor connected over the output terminals of each such downconverter unit except for the last downconverter unit (but for a small current filtering capacitor), such that each corresponding subsequent downconverter unit receives at its input a constant voltage. Furthermore, each such downconverter units may receive a control signal from a corresponding control unit, all control units receiving a corresponding command signal derived from a common master command signal. Alternatively, the last downconverter unit may be provided with an output sensor generating a sensor signal indicating the output conditions at the output of the last downconverter unit, for instance the current delivered by that final downconverter unit, while from this sensor signal information is derived which is fed back to all previous downconverter units in order to control the operation of such previous downconverter units such as to respond early to any load variations. In all of these cases, by feeding back information derived from measuring output conditions of the final downconverter unit, it is possible to counteract voltage variations at the output of such previous downconverter units even before such voltage variations actually occur.

Furthermore, with reference to FIGS. 5 and 6, the downconverter device 30 is described as having multiple control units 61, 62, each associated with a respective downconverter unit 31, 32. However, alternatively it is possible to have only one control unit having multiple outputs connected to respective downconverter units 31, 32.

The invention claimed is:

1. A method for driving a gas discharge lamp, said method comprising the steps of:
   providing electric first DC power at a relatively high voltage and a relatively low current;
   converting the first DC power down to a second DC power at a relatively low voltage and a relatively high current;
   feeding the second DC power to a gas discharge lamp as alternating current;
   wherein the conversion of the first DC power to the second DC power is performed in at least two steps, a first one of such steps including the step of converting down the first DC power to an intermediate DC power at an intermediate DC voltage lower than the high voltage but higher than the low voltage, a second one of such steps including the step of converting down the intermediate DC power to the second DC power.

2. Method according to claim 1, wherein the down conversion ratios of all down conversion steps are substantially equal to each other, the down conversion ratios of such steps being defined, for each down conversion step, as the ratio of input DC voltage to output DC voltage.

3. Method according to claim 1, wherein each down conversion step is controlled by a control signal derived from one common control signal.

4. Method according to claim 3, wherein the control of a subsequent down conversion step is slightly delayed with respect to the control of a previous down conversion step.

5. Method according to claim 1, wherein control information is derived from at least one of the relatively low voltage and the relatively high current, and wherein this information is fed back in order to control the previous down conversion steps.

6. Downconverter device for use in a driving apparatus for a gas discharge lamp, the downconverter device comprising:
   a first downconverter unit having an output;
   a second downconverter unit having an input connected to the output of the first downconverter unit.

7. Downconverter device according to claim 6 and further comprising a capacitor having its terminals connected to the output of the first downconverter unit.

8. Downconverter device according to claim 6 wherein each downconverter unit comprises a controllable component, and wherein each downconverter unit is associated with a control unit generating a control signal for controlling said controllable component;
   wherein each control unit has a command input for receiving a command signal, and is adapted to generate its control signal in response to the command signal received at its input;
   wherein the downconverter device further comprises means for generating all command signals as derived from one common master command signal.

9. Downconverter device according to claim 8, wherein a later control unit has an input for receiving a master command signal, and an output connected to the command input of a previous control unit.

10. Downconverter device according to claim 8, wherein the command inputs of the control units are connected together to receive the same command signal.

11. Downconverter device according to claim 8, further comprising a master control unit having an input for receiving a master command signal, and having outputs connected to the command input of the control units.

12. Downconverter device according to claim 11, wherein the master control unit is adapted to generate a command signal for a control unit slightly delayed with respect to a command signal for a previous control unit.

13. Downconverter device according to claim 6, wherein a final downconverter unit is provided with an output sensor adapted to generate a sensor signal reflecting an output condition of said final downconverter unit;
   wherein a previous downconverter unit comprises a controllable component receiving a control signal from a control unit associated with said previous downconverter unit;
   said control unit having a command input coupled to receive information derived from said sensor output signal.

14. Downconverter device according to claim 13, wherein the sensor output signal is coupled directly to said command input of the control unit.

15. Downconverter device according to claim 13, wherein the sensor output signal is coupled to a modifier, and wherein an output signal of said modifier is coupled to said command input of said control unit.

16. Downconverter device according to claim 13, wherein the sensor includes at least one of a current sensor and a voltage sensor.

17. Driving apparatus for driving a gas discharge lamp, especially a UHP lamp, comprising:
   an input (2) for receiving an AC mains voltage;
   an AC/DC converter for converting the AC input voltage to a DC output voltage;
   a downconverter device having an input coupled to an output of said AC/DC converter, the downconverter device further having an output, and the downconverter device being arranged for converting the DC voltage received at its input to a DC output current at its output;
   the driving apparatus further having an output for connecting thereto a gas discharge lamp to be driven;
   the driving apparatus preferably further comprising a commutator coupled between the output of said downconverter device and the output of the driving apparatus;
   wherein the driving apparatus comprises a multiple-stage downconverter device as claimed in claim 6.

* * * * *